US012412699B2

(12) United States Patent
Zhou et al.

(10) Patent No.: US 12,412,699 B2
(45) Date of Patent: Sep. 9, 2025

(54) THOMSON COIL DESIGN AND POTTING PROCESS

(71) Applicant: EATON INTELLIGENT POWER LIMITED, Dublin (IE)

(72) Inventors: Xin Zhou, Wexford, PA (US); Santhosh Kumar Chamarajanagar Govinda Nayaka, Moon Township, PA (US); Robert Michael Slepian, Murrysville, PA (US); Zhixi Deng, Moon Township, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 224 days.

(21) Appl. No.: 18/232,460

(22) Filed: Aug. 10, 2023

(65) Prior Publication Data

US 2024/0062956 A1 Feb. 22, 2024

Related U.S. Application Data

(60) Provisional application No. 63/398,602, filed on Aug. 17, 2022.

(51) Int. Cl.
*H01F 41/12* (2006.01)

(52) U.S. Cl.
CPC .................................... *H01F 41/12* (2013.01)

(58) Field of Classification Search
CPC ........................................................ H01F 41/12
USPC .......................................................... 428/102
See application file for complete search history.

(56) References Cited

U.S. PATENT DOCUMENTS

| | | | | |
|---|---|---|---|---|
| 2016/0351367 | A1* | 12/2016 | Jeong | H01H 71/2481 |
| 2018/0318677 | A1* | 11/2018 | Wang | A63B 60/00 |
| 2020/0194206 | A1 | 6/2020 | Wang et al. | |
| 2020/0258704 | A1 | 8/2020 | Yu et al. | |
| 2024/0062956 | A1* | 2/2024 | Zhou | H01F 41/12 |

OTHER PUBLICATIONS

European Patent Office "International Search Report and Written Opinion" for corresponding International (PCT) Application No. PCT/EP2023/025379, dated Jan. 8, 2024, 14 pp.

* cited by examiner

*Primary Examiner* — Betelhem Shewareged
(74) *Attorney, Agent, or Firm* — Eckert Seamans Cherin & Mellott, LLC

(57) ABSTRACT

An assembly for manufacturing the insulation layer of a Thomson coil includes a base plate, a coil housing, and a cover plate. The base plate securely seats the coil housing, and the coil housing securely seats a Thomson coil and the cover plate. The cover plate has several ribs that hold multiple turns of a Thomson coil in place while epoxy is applied to the coil, thus ensuring that the epoxy is evenly distributed on the coil surface and that the coil windings remain level. The cover plate and coil housing are structured to either receive a high-pressure epoxy injection or to be used in an epoxy potting process, during which all exposed areas of the Thomson coil are coated by liquid epoxy. After the epoxy has solidified, the Thomson coil is coupled to the coil housing, and the housed and insulated Thomson coil is removed from the assembly.

12 Claims, 7 Drawing Sheets

THOMSON COIL DESIGN AND POTTING PROCESS

CROSS REFERENCE TO RELATED APPLICATIONS

This application claims priority to U.S. Patent Application Ser. No. 63/398,602, filed Aug. 17, 2022 and entitled, "Thomson Coil Design And Potting Process".

FIELD OF THE INVENTION

The disclosed concept relates generally to Thomson coils, and in particular, to systems and methods used to produce an insulation layer for Thomson coils.

BACKGROUND OF THE INVENTION

Thomson coil assemblies are used to achieve ultra-fast motion and/or displacement in various applications. One well-known application is the use of Thomson coil assemblies as the actuators in the switching mechanisms of circuit breakers, including hybrid circuit breakers. Oftentimes, a circuit breaker includes one stationary separable contact and one movable contact which need to be in physical contact to conduct power. The stationary separable contact is connected to a stationary conductor that remains fixed in place, and the movable separable contact is connected to a movable conductor assembly that can be driven between a closed position and an open position by an actuator, such as a Thomson coil assembly. When the separable contacts are closed and the trip unit detects a fault condition, the trip unit transmits a signal to cause the actuator to drive the movable conductor assembly away from the stationary separable contact and to the open position, in order to interrupt the flow of power.

Circuit breakers are designed to interrupt the flow of power quickly, and arcing can occur as a result of opening the separable contacts. Hybrid circuit breakers reduce arcing by using electronics to commutate current when the separable contacts are opened. However, the electronics can only withstand the flow of the commutated current for a short period of time before incurring damage. Thus, achieving ultra-fast motion and/or displacement of the separable contacts during an opening operation is especially important in hybrid circuit breakers, in order to achieve the required gap between the separable contacts (often referred to as a "contact gap") within an extremely short period of time. Thomson coil actuators are able to achieve such ultra-fast motion and displacement that other conventional switching mechanisms cannot achieve.

A Thomson coil assembly comprises a coiled conductor (i.e. a Thomson coil) and a conductive plate positioned in close proximity to the Thomson coil. The Thomson coil is configured to receive current, and when current is supplied to the Thomson coil, the magnetic field generated by the flow of current through the coil exerts a repulsion force on the conductive plate, driving the conductive plate away from the Thomson coil. When Thomson coil actuators are used in circuit interrupters, the conductive plate is typically coupled to the movable conductor assembly. When the trip unit detects a fault condition, the trip unit transmits a signal that causes current to be supplied to the Thomson coil, and the magnetic field produced by the Thomson coil acts upon the conductive plate to drive the movable conductor assembly away from the stationary contact.

The Thomson coil is typically covered with an insulation layer in order to provide insulation between the Thomson coil and the conductive plate, in order to more precisely control the magnitude and orientation of the magnetic fields produced by the Thomson coil. The effectiveness of a Thomson coil actuator, particularly when used as a switching mechanism in a circuit breaker, relies on the manufacturing process used for producing the insulation layer being able to closely and consistently adhere to design specifications. Known methods for large-scale manufacturing of the insulation layer for Thomson coils include using a potting process. The potting process is intended to be carried out by holding the Thomson coil in a fixed position while the insulation material is applied to the Thomson coil, so that a thin insulation layer will form on the Thomson coil. However, known potting processes often result in the insulation layer having non-uniform thickness and the coil windings being uneven due to the unraveling tendency of the conductors used to form Thomson coils. Such deviations from design specifications have a significant effect on the performance of Thomson coil actuators.

There is thus room for improvement in the systems and methods used to produce the insulation layer of Thomson coils.

SUMMARY OF THE INVENTION

These needs, and others, are met by embodiments of an assembly for manufacturing the insulation layer of a Thomson coil disclosed herein. The disclosed assembly embodiments include a base plate, a coil housing, and a cover plate. The base plate securely seats the coil housing, and the coil housing securely seats a Thomson coil and the cover plate. The cover plate has several ribs that hold multiple turns of a Thomson coil in place while epoxy is applied to the coil, thus ensuring that the epoxy is evenly distributed on the coil surface and that the coil windings remain level. The cover plate and coil housing are structured to either receive a high-pressure epoxy injection or to be used in an epoxy potting process, during which all exposed areas of the Thomson coil are coated by liquid epoxy. After the epoxy has solidified, the Thomson coil is coupled to the coil housing, and the housed and insulated Thomson coil can be removed from the assembly. Any areas of the Thomson coil that were engaged by the ribs during the application of the epoxy can be overmolded with epoxy after the housed and insulated Thomson coil is removed from the assembly.

In one exemplary embodiment of the disclosed concept, an insulation manufacturing assembly for manufacturing an insulation layer for a Thomson coil comprises: a base plate, a coil housing structured to seat the Thomson coil, a cover plate comprising a plurality of ribs and a plurality of flow passages, and a number of fasteners that fasten the cover plate, the coil housing, and the base plate to one another. The base plate seats the coil housing and the coil housing seats the cover plate. The ribs are structured to engage multiple turns of the Thomson coil and secure the multiple turns in place such that the multiple turns form a level surface. The flow passages are structured to enable a liquid epoxy to flow around the ribs and cover a top surface of the Thomson coil that faces away from the coil housing In another exemplary embodiment of the disclosed concept, an insulation manufacturing assembly for manufacturing an insulation layer for a Thomson coil comprises: a base plate, a coil housing structured to seat the Thomson coil; a cover plate, and a number of fasteners that fasten the cover plate, the coil housing, and the base plate to one another. The coil housing includes: a coil seating surface with a central opening and a trough disposed adjacent to the central opening. The cover plate includes: a plurality of ribs, a plurality of flow passages, and an overflow cutout. The base plate seats the coil housing and the coil housing seats the cover plate. The ribs are structured to engage multiple turns of the Thomson coil and secure the multiple turns in place such that the multiple turns form a level surface. The flow passages are structured to enable a liquid epoxy to flow around the ribs and cover a top surface of the Thomson coil that faces away from the coil housing. The overflow cutout aligns with the trough such that an excess amount of the liquid epoxy can flow out of the insulation manufacturing assembly.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1A:
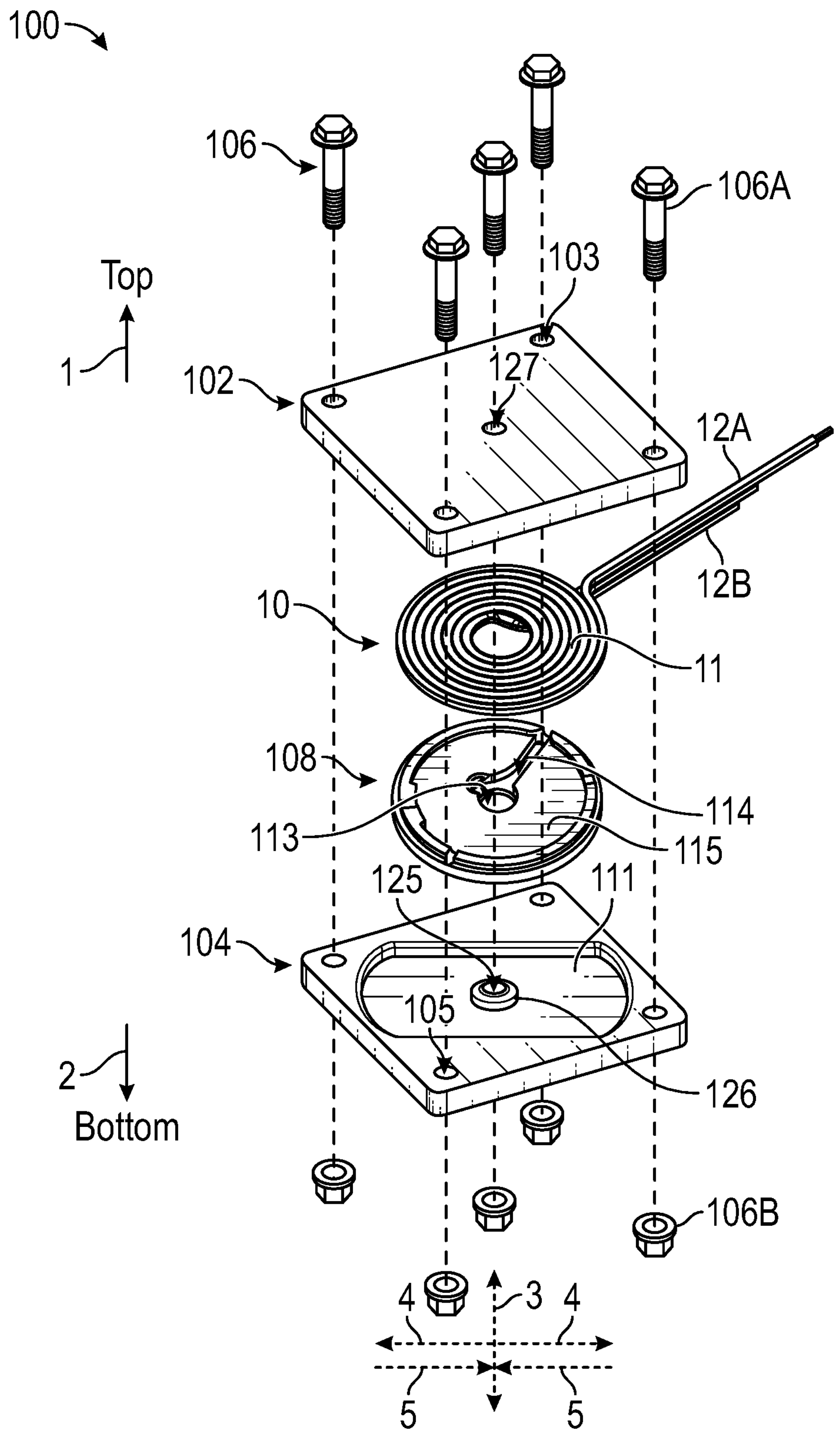
FIG. 1A is an exploded view of an insulation manufacturing assembly for producing an insulation layer for a Thomson coil using a high-pressure injection process, in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

Described herein are embodiments of an advantageously designed insulation manufacturing assembly for use in producing the insulation layer of a Thomson coil. The disclosed insulation manufacturing assembly embodiments are structured to hold a Thomson coil securely in place during manufacturing of the insulation layer, thus ensuring that the insulating material is evenly distributed on the surface of the Thomson coil, and that the coil windings will be even and level. It will be appreciated that the disclosed insulation manufacturing assembly embodiments facilitate better large-scale and automated manufacturing of insulation layers for Thomson coil assemblies.

Figure 1B:
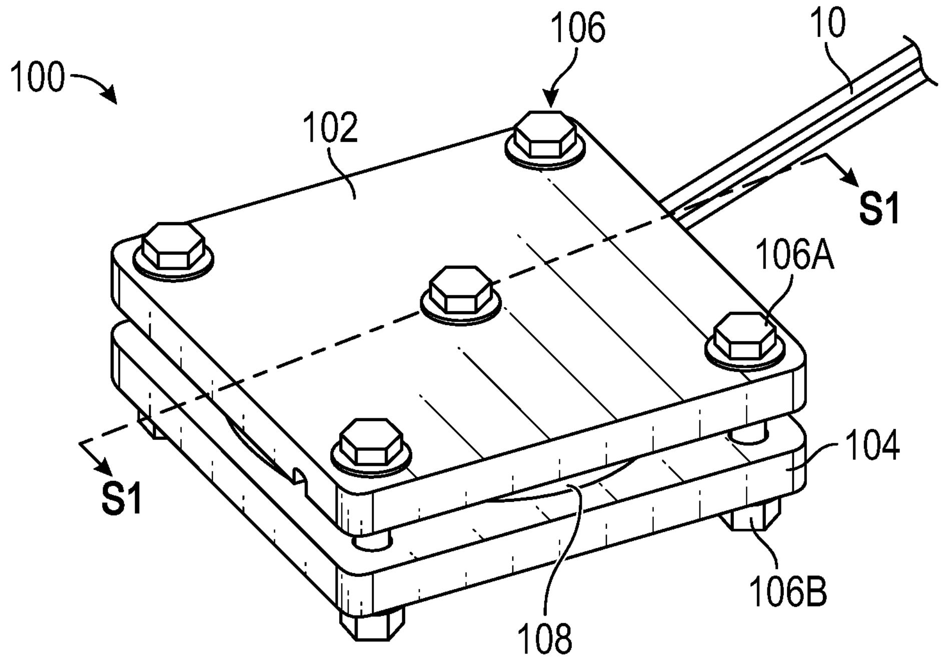
FIG. 1B is a perspective view of the insulation manufacturing assembly shown in FIG. 1A.
Figure 1C:
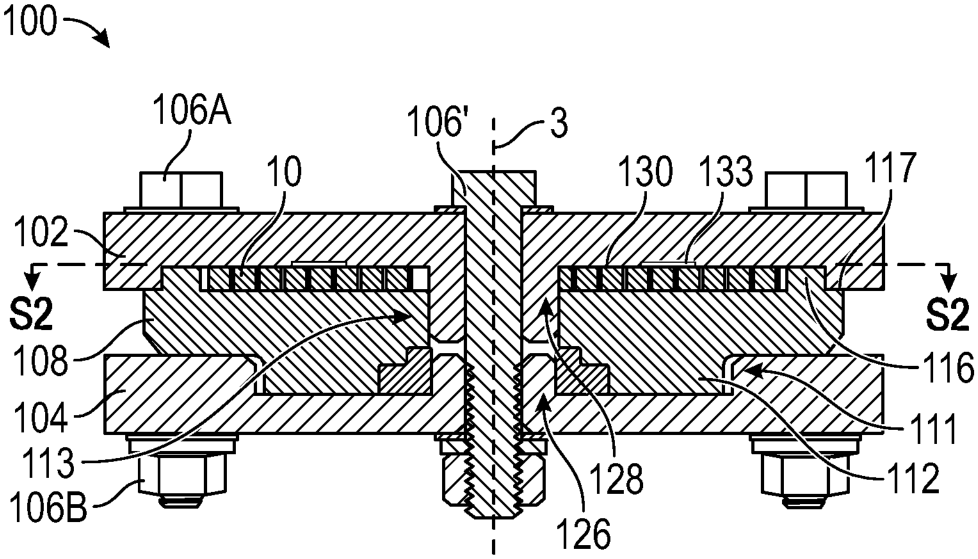
FIG. 1C is a sectional view of the insulation manufacturing assembly shown in FIG. 1B, taken along the line S1-S1 shown in FIG. 1B and FIG. 5.
Figure 1D:
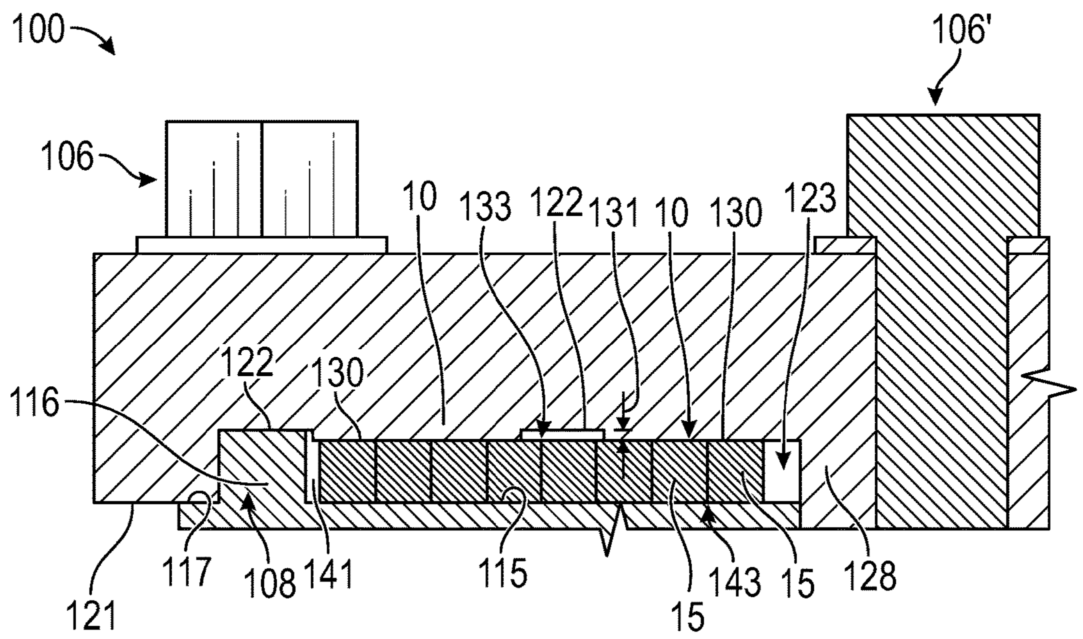
FIG. 1D is an enlargement of a portion of the sectional view shown in FIG. 1C, in order to better show details of the ribs of the cover plate shown in FIG. 1C.

FIGS. 1A-1C respectively show an exploded view, a perspective view, and a sectional view of an insulation manufacturing assembly 100 in accordance with a first embodiment of the disclosed concept, the insulation manufacturing assembly 100 being structured for use in producing an insulation layer for a Thomson coil 10 using a high-pressure injection process. FIG. 1D shows an enlarged portion of FIG. 1C in order to show certain details of the insulation manufacturing assembly 100 more clearly. For the sake of brevity, the insulation manufacturing assembly 100 is referred to hereinafter as the "assembly 100".

For clarity and ease of explanation, the assembly 100, each of its components, and all other components discussed in relation to the assembly 100 are referred to herein as having a top side and a bottom side. Orientation toward the top side of a component is denoted by the arrow 1 in FIG. 1A, and orientation toward the bottom side of a component is denoted by the arrow 2 in FIG. 1B. For example, in accordance with the directions of "top" and "bottom" as denoted by arrows 1 and 2 in FIG. 1A, only the top side of the components is visible in FIG. 1A. Similarly, if a first component is positioned nearer to the top side of a second component rather than to the bottom side, then the terms "above" or "upward" can be used to describe the disposition of the first component relative to the second component. Conversely, if a first component is positioned nearer to the bottom side of a second component rather than to the top side, then the terms "below" or "downward" can be used to describe the disposition of the first component relative to the second component. In addition, the assembly 100 comprises a central axis 3 (labeled in FIGS. 1A and 1C). Movement or orientation away from the central axis 3 can be described as "lateral", which is indicated by the arrows 4 in FIG. 1A, while movement or orientation toward the central axis 3 can be described as "medial", which is indicated by the arrows 5 in FIG. 1A.

The assembly 100 includes a cover plate 102 and a base plate 104 structured to be fixedly coupled together by a number of fasteners 106, and a coil housing 108 structured to be seated on the top side of the base plate 104 and beneath the cover plate 102. The top side of the coil housing 108 is structured to seat the Thomson coil 10. The cover plate 102 comprises a plurality of apertures 103 and the base plate 104 comprises a plurality of apertures 105, with the apertures 103 and 105 being structured to receive the fasteners 106. The fasteners 106 can comprise, for example and without limitation, clamping fasteners, but it should be noted that the fasteners 106 can comprise any type of fastener suitable for maintaining the components of the assembly 100 in a fixed orientation relative to one another during the manufacturing process without departing from the scope of the disclosed concept. Each of the fasteners 106 shown in FIGS. 1A-1B comprises a bolt 106A and a nut 106B.

The components of the assembly 100 are advantageously designed to ensure that all components used during the process of producing the insulation layer for the Thomson coil 10 are correctly oriented and coupled to one another during the manufacturing process, i.e. such that the components of the assembly 100 remain in a fixed orientation relative to one another. In particular and as detailed further later herein, the top side of the base plate 104 is structured to receive the bottom side of the coil housing 108 in order to snugly seat the coil housing 108, the top side of the coil housing 108 is structured to receive the bottom side of the Thomson coil 10 in order to snugly seat the Thomson coil 10, and a bottom side of the cover plate 102 is structured to engage the top side of the coil housing 108 and surround the top side of the Thomson coil 10 in order to ensure that the Thomson coil 10 remains secured within the coil housing 108 during manufacturing of the insulation layer. After the base plate 104, coil housing 108, Thomson coil 10, and cover plate 102 are seated as described above, the fasteners 106 are inserted through the apertures 103 and 105 and suitably secured to ensure that the components of the assembly 100 remain fixedly coupled to one another.

It is noted that, due to the Thomson coil 10 being circular, the coil housing 108 is consequently circular. Thus, several features of the coil housing 108 detailed later herein are described and referred to in terms of attributes inherent to a circle, including but not limited to “diameter”, “circumference”, etc. However, to the extent that it may be desired to produce an insulation layer for a Thomson coil having another planar, non-circular shape, it will be apparent from the detailed description of the disclosed concepts that the designs disclosed herein for a circular Thomson coil 10 and correspondingly circular coil housing 108 can easily be adapted for other planar shapes, without departing from the scope of the disclosed concept.

Figure 2A:
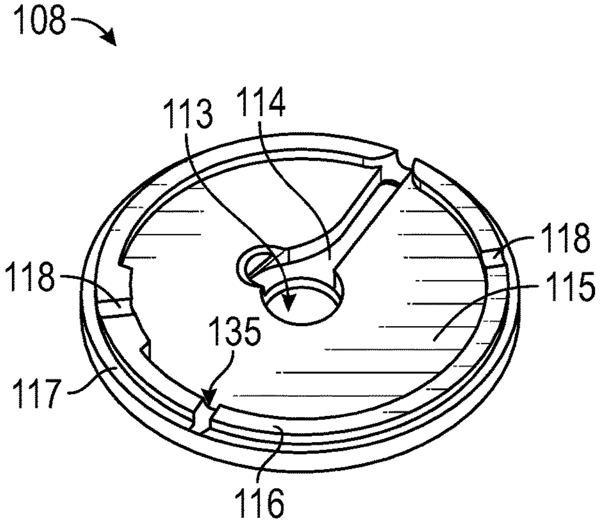
FIG. 2A is a perspective view of the top side of the coil housing shown in FIGS. 1A-1C.
Figure 2B:
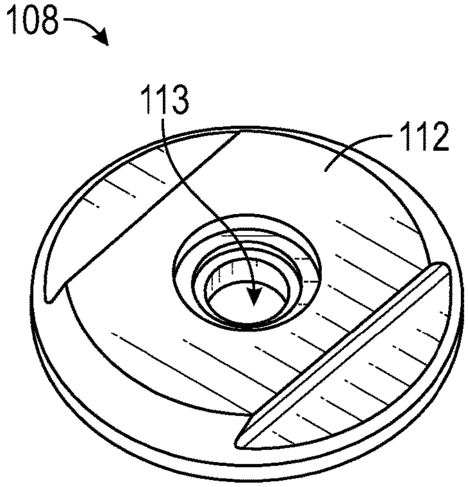
FIG. 2B is a perspective view of the bottom side of the coil housing shown in FIGS. 1A-1C.
Figure 3A:
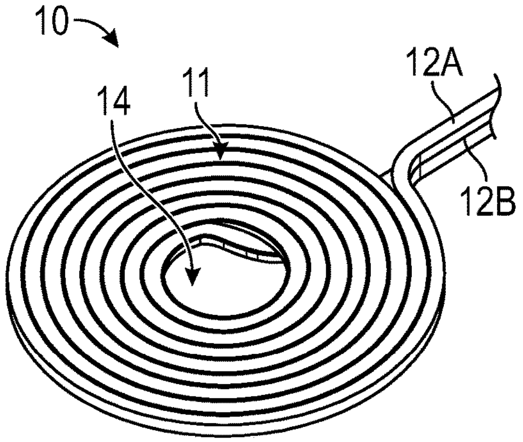
FIG. 3A is a perspective view of the top side of the Thomson coil shown in FIGS. 1A-1C.
Figure 3B:
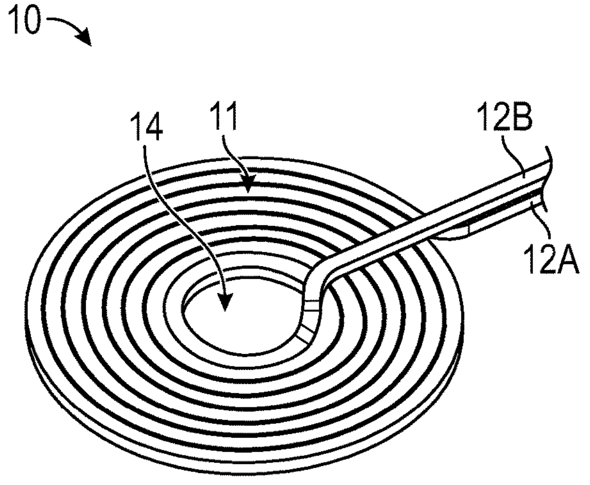
FIG. 3B is a perspective view of the bottom side of the Thomson coil shown in FIGS. 1A-1C.

As can be seen in FIGS. 1A and 1C, the top side of the base plate 104 is formed with a depression 111, and as can be seen in FIG. 1C and FIG. 2B, the bottom side of the coil housing 108 is formed with a protrusion 112 formed in the same shape as the depression 111 and structured to fit snugly within the depression 111, enabling the base plate 104 to snugly seat the coil housing 108. As can be seen in FIG. 1A, FIG. 3A (showing the top side of the Thomson coil 10), and FIG. 3B (showing the bottom side of the Thomson coil 10), the Thomson coil 10 comprises a coiled planar portion 11 and two leads 12 (one lead being numbered as 12A and the other lead being numbered as 12B in FIG. 1A) extending laterally away from the center of the planar portion 11, with each lead 12 being one end of the conductor used to form the planar portion 11. The lead 12A can be thought of as the start of the outermost turn of the Thomson coil 10, and as the conductor is wound into increasingly smaller concentric rings to form the planar portion 11, the lead 12B routed from the center of the planar portion 11 to be positioned adjacent to and below the bottom side of the planar portion 11 and to extend laterally beyond the outer edge of the planar portion 11. It will be appreciated that the leads 12 are proportioned to be sufficiently long in order to be connected to a current source, such as when the Thomson coil 10 is placed in operation in a circuit interrupter, for example and without limitation.

As can be seen in FIG. 1A and FIG. 2A, the top side of the coil housing 108 comprises a central opening 113 and a trough 114. The trough 114 extends between the central opening 113 and a lateral edge of the coil housing 108, such that one end of the trough 114 is adjacent to the central opening 113, and a bottom surface of the trough 114 is disposed above the bottom side of the coil housing 108 and below a flat coil seating surface 115 of the coil housing 108. The trough 114 is thus structured and positioned to receive the two leads 12 of the Thomson coil 10 and to enable the bottom side of the coil planar portion 11 to lie flat upon the coil seating surface 115 so that the coil 10 can be seated on the top side of the coil housing 108.

As shown in FIG. 2A, the coil housing 108 includes a flange 116 that extends upward from the coil seating surface 115, thereby forming a lip 117 that surrounds the flange 116, with the outer circumference of the flange 116 coinciding with the inner circumference of the lip 117. In the views shown in FIGS. 2A and 1D, it can be seen that the top surface of the lip 117 is co-planar with the coil seating surface 115. The flange 116 is proportioned to fit around the circumference of the Thomson coil 10. The flange 116 is also formed with a number of alignment grooves 118 (FIG. 2A) that are structured to receive corresponding alignment tabs of the cover plate 102 (detailed later herein). Each alignment groove 118 is formed as a cutout in the top of the flange 116, such that a bottom surface of the alignment groove 118 is disposed above the lip 117 and the coil seating surface 115, and such that the alignment groove 118 extends between the outer diameter and the inner diameter of the flange 116.

Figure 4:
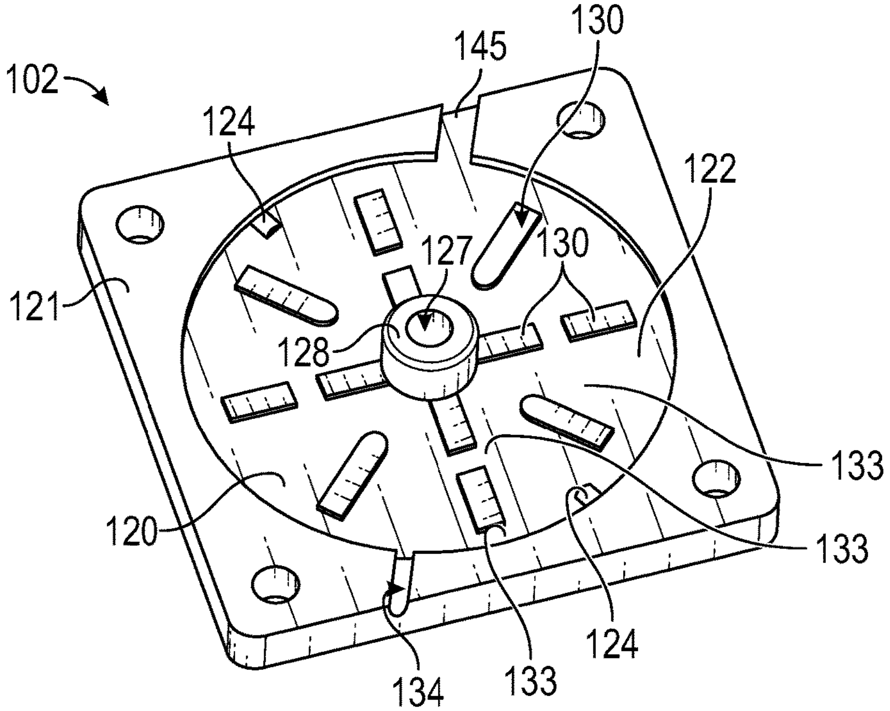
FIG. 4 is a perspective view of the bottom side of the cover plate shown in FIGS. 1A-1C.

Referring now to FIG. 4, the bottom side of the cover plate 102 is formed with a circular depression 120 that extends upward relative to a bottom flat surface 121 of the cover plate 102 such that a circular surface 122 of the circular depression 120 is disposed above the bottom flat surface 121 (it is noted that the term “upward” is used in accordance with the directions of “top” and “bottom” denoted by arrows 1 and 2 in FIG. 1A). For reasons that will become apparent later herein, the circular surface 122 is referred to hereinafter as the “flow passage surface 122”. The circular depression 120 is structured to receive the coil housing flange 116 such that the flow passage surface 122 engages the top surface of the flange 116 when the cover plate 102 is seated on the coil housing 108, as shown in FIG. 1D. The upward extension of the circular depression 120 relative to the bottom flat surface 121 results in the flow passage surface 122 being disposed above the Thomson coil 10 in the assembly 100, as shown in FIG. 1D. Still referring to FIG. 1D, a chamber 123 is formed when the cover plate 102 is seated on the coil housing 108 due to the engagement between the flow passage surface 122 and the flange 116. The coil seating surface 115 of the coil housing 108 forms the bottom of the chamber 123, and the flow passage surface 122 of the cover plate 102 forms the top of the chamber 123. In the medial to lateral dimension, the chamber 123 extends between a downward protruding rim 128 (detailed later herein) of the cover plate 102 and the flange 116 of the coil housing 108.

Referring once more to FIG. 4, the bottom side of the cover plate 102 is also formed with a number of alignment tabs 124, with each alignment tab 124 being structured to be inserted into a corresponding one of the alignment grooves 118 (FIG. 2A) of the coil housing 108. While the cover plate 102 and the coil housing 108 are respectively depicted in the figures as having two alignment tabs 124 and two alignment grooves 118, it will be appreciated that these components can be formed with fewer or more than two alignment tabs 124 and alignment grooves 118 without departing from the scope of the disclosed concept. Inserting the alignment tabs 124 into the alignment grooves 118 prevents the cover plate 102 and coil housing 103 from moving laterally relative to one another.

In addition to the features noted above, each of the base plate 104, coil housing 108, and cover plate 102 comprise features aligning with the central axis 3 of the assembly 100 in order to ensure that all three of these components are properly centered when the assembly 100 is assembled. These features are especially apparent in the sectional view shown in FIG. 1C. Specifically, the base plate 104 comprises a central opening 125 and an upward protruding rim 126 that surrounds the central opening 125 (see FIGS. 1A and 1C), the cover plate 102 comprises a central opening 127 and a downward protruding rim 128 that surrounds the central opening 127 (see FIGS. 1A, 1C, and 4), and the coil housing 108 comprises the central opening 113 (see FIGS. 1C and 2A-2B) structured to receive the upward protruding rim 126 and the downward protruding rim 128. The downward protruding rim 128 is also structured to be received by a central opening 14 of the Thomson coil 10.

The upward protruding rim 126 and downward protruding rim 128 are structured to function as guide portions that respectively guide the coil housing 108 to be properly seated on the base plate 104 and guide the cover plate 102 to be properly seated on the coil housing 108. The upward protruding rim 126 and the downward protruding rim 128 are also structured to receive one of the fasteners 106, which can be referred to as the central fastener 106' (due to being aligned with the central axis 3 when inserted into the upward and downward protruding rims 126, 128. After the central fastener 106' is inserted into the upward and downward protruding rims 126, 128, it can be suitably secured in order to couple the base plate 104, the coil housing 108, the Thomson coil 10, and the cover plate 102 to one another and maintain the central openings 127, 14, 113, 125 in alignment with the central axis 3 during the insulation layer manufacturing process. In addition, it is noted that the downward protruding rim 128 of the cover plate 102 is structured to fit snugly within the coil housing central opening 113, in order to prevent liquid epoxy from flowing downward below the Thomson coil 10 during the process of producing the insulation layer, as detailed later herein.

Referring once more to FIG. 4 and in conjunction with FIG. 1D, one of the advantageous features of the assembly 100 is a plurality of ribs 130 formed on the bottom side of the cover plate 102. As best shown in FIG. 1D, each rib 130 extends downward relative to the flow passage surface 122 of the circular depression 120. As shown in FIG. 1D, when the Thomson coil 10 and the cover plate 102 are seated on the coil housing 108, the bottom surface of each rib 130 engages the top surface of the Thomson coil 10, while the flow passage surface 122 of the cover plate 102 remains spaced a distance 131 away from the top surface of the Thomson coil 10 (distance 131 may also be referred to hereinafter as "height 131", as context necessitates). The spaces between the ribs 130 (i.e. the spaces of height 131 between the flow passage surface 122 and the Thomson coil 10 in the chamber 123) form material flow passages 133 (numbered in FIG. 1D, FIG. 4, and FIG. 5) through which injected liquid insulative molding material can flow. Each rib 130 is proportioned and positioned to be able to secure multiple turns 15 of the Thomson coil 10 at a time (the turns 15 being numbered in FIG. 1D), in order to ensure that the planar portion 11 forms a level surface when the insulation layer is forming, i.e. such that the turns 15 lie flat relative to one another. In addition to keeping the turns 15 of the Thomson coil 10 secure to ensure that the planar portion 11 forms a level surface, the bottom surfaces of the ribs 130 contact a relatively small portion of the surface area of the Thomson coil 10, thus minimizing the surface area that the injected insulating material cannot cover.

Referring to FIG. 4 in conjunction with FIG. 2A, it is noted that the cover plate 102 and the coil housing 108 are each formed with a respective material injection cutout 134, 135, and that the material injection cutouts 134, 135 align with one another to form a material injection path 136 when the cover plate 102 is seated on the coil housing 108. The material injection path 136 is numbered in FIG. 5, although it is noted that only the bottom portion of the material injection path 136 can be seen in the sectional view of FIG. 5. The material injection path 136 forms a tunnel leading from the exterior of the assembly 100 to the interior of the chamber 123 (the chamber being numbered in FIG. 1D), and specifically leads to one of the material flow passages 133 of the chamber 123. Thus, the material injection path 136 is in fluid communication with the material flow passages 133, and is structured to receive a high-pressure injector that can inject liquid insulative molding material (for example and without limitation, liquid epoxy) into the chamber 123 in order to form the insulation layer of the Thomson coil 10. For the sake of brevity, the liquid insulative molding material will be referred to hereinafter as being liquid epoxy, but it should be understood that liquid materials other than epoxy can be used without departing from the scope of the disclosed concept, provided that said materials can harden into a solid and have sufficient insulation capability for use with a Thomson coil 10.

Figure 5:
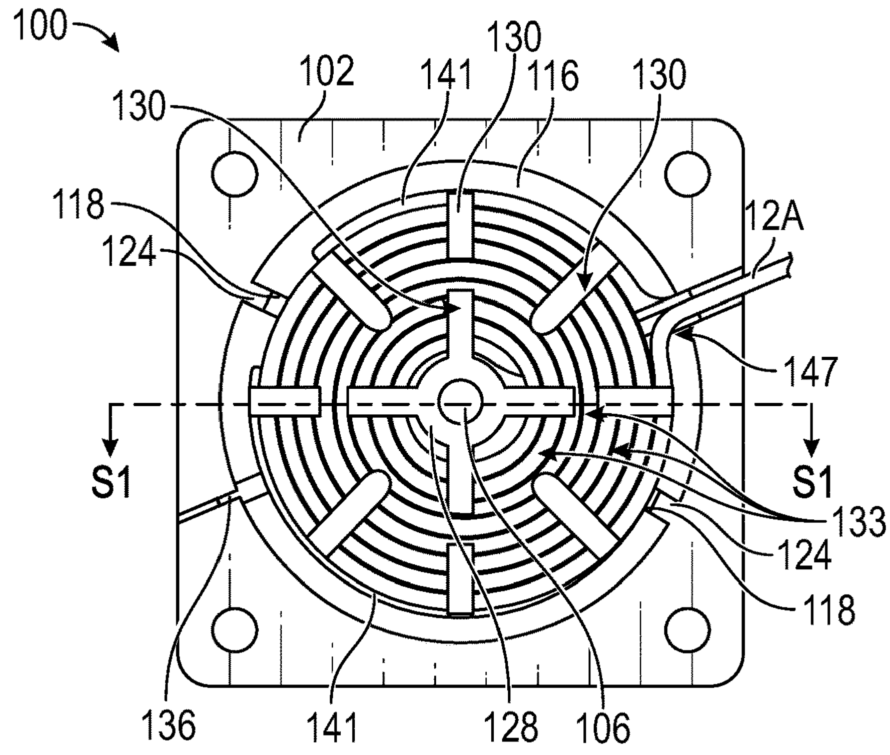
FIG. 5 is a sectional view of the insulation manufacturing assembly shown in FIG. 1C, taken along the line S2-S2 shown in FIG. 1C, showing points of contact between ribs of the cover plate and the top side of the Thomson coil.

In FIG. 1D and FIG. 5, it can be seen that there is space 141 between the outer edge of the Thomson coil 10 and the inner circumference of the coil housing flange 116. This space 141 is referred to hereinafter as the "material flow channel 141". It is noted that the channel 141 varies in width in the lateral dimension. In addition, there is a gap 143 between all adjacent turns 15 of the Thomson coil 10 (see FIG. 1D), each gap 143 being referred to hereinafter as a "coil turn gap 143". When liquid epoxy is injected into the chamber 123 through the material injection path 136, the liquid epoxy flows over the top surface of the Thomson coil 10 through the material flow passages 133, into the material flow channel 141, and into the coil turn gaps 143. The epoxy that fills the material flow channel 141 serves to keep the Thomson coil 10 fixed in place within the coil housing 108.

The cover plate 102 is also formed with an overflow cutout 145 (FIG. 4) that is positioned to align with at least a lateral end of the trough 114 (FIG. 2A) of the coil housing 108 in order to form an overflow channel 147 (FIG. 5) when the cover plate 102 is seated on the coil housing 108. The overflow channel 145 enables the interior of the chamber 123 (FIG. 1D) to be in fluid communication with the exterior of the assembly 100. The chamber 123 is structured such that, after the epoxy has been injected into the chamber 123 and has filled all of the material flow passages 133, the material flow channel 141, and the coil turn gaps 143, any excess epoxy will flow out of the chamber 123 through the overflow channel 147 to the exterior of the assembly 100.

Once the epoxy injection is complete and the liquid epoxy has solidified, the manufacturing of the insulation layer is complete. The final product of the insulation manufacturing process using the assembly 100 is a unitary structure comprising the Thomson coil 10 seated in and coupled to the coil housing 108 via the epoxy, with a layer of solidified epoxy coating the Thomson coil 10, and this final product is referred to hereinafter as the "housed and insulated Thomson coil 10'" (not shown in the figures). After the epoxy has solidified, the fasteners 106 are removed from the assembly 100, the cover plate 102 is unseated from the top of the coil housing 108, and the coil housing 108 is unseated from the base plate 104.

Prior to coupling the components of the assembly 100 together and injecting the epoxy into the material injection path 136, anti-adhesion primer is applied to the surfaces of the cover plate 102 to facilitate easy removal of the cover plate 102 from the epoxy-coated Thomson coil 10 and coil housing 108 after the manufacturing process is complete. In addition, the downward protruding rim 128 of the cover plate 102 prevents the epoxy from flowing into the coil central opening 14 and the central opening 113 of the coil housing 108, in order to facilitate easy removal of the cover plate 102 and base plate 104 after the manufacturing process is complete.

If needed, any areas of the housed and insulated Thomson coil 10' that are not covered by epoxy (i.e. those areas of the top side of the Thomson coil 10 that were engaged by the ribs 130 of the cover plate 102) can be filled in with insulating material using any suitable method, for example and without limitation, by overmolding, or using insulating tape or insulating plastic parts. However, in certain instances, it may not be necessary to fill in the non-covered areas, depending on the type of wire conductor used to form the Thomson coil. For example, wires typically include film insulation and many wires include an insulating finish such as varnish or shellac around the conductive portion of the wire, which may eliminate the need to fill in the areas of the Thomson coil 10 that were engaged by the ribs 130. However, shellac in particular can crack, so it may be desirable to fill in the gaps on the top surface of the Thomson coil 10 with epoxy even if the wire includes an insulating finish.

Figure 6:
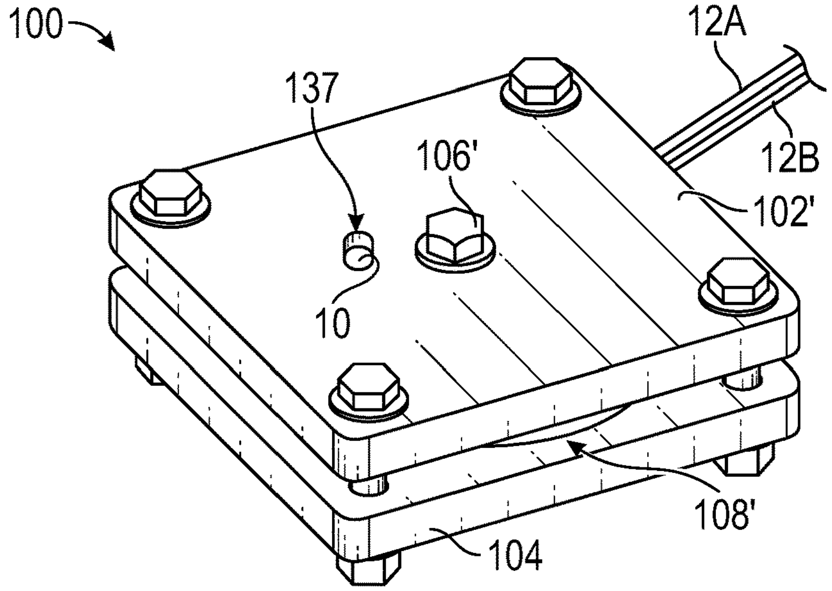
FIG. 6 is a perspective view of the insulation manufacturing assembly shown in FIG. 1A, with an alternative embodiment of the cover plate shown in FIG. 1A.

It should be noted that the location of the material injection path 136 shown in FIG. 5 is representative and that a material injection path can be formed elsewhere in the assembly 100 without departing from the scope of the disclosed concept. In one non-limiting illustrative example shown in FIG. 6, the assembly 100 includes a cover plate 102' instead of the cover plate 102, and includes a coil housing 108' instead of the coil housing 108. (It is noted that the coil housing 108' is identical to the coil housing 208 shown in FIG. 7, as part of an assembly 200 described later herein.) The cover plate 102' does not include a material injection cutout 134 and the coil housing 108' does not include a material injection cutout 135, due to the cover plate 102' instead comprising a thru-hole 137 that extends from the top side of the cover plate 102' to the bottom side of the cover plate 102'. The thru-hole 137 is an alternative embodiment of the material injection path 136 and enables a high-pressure epoxy injector to deposit the epoxy directly into one of the material flow passages 133 from a position located above the top side of the Thomson coil 10. This manufacturing method allows precise control of the epoxy insulation layer thickness on top of the Thomson coil 10, which is a significant factor in the performance of the Thomson coil 10. It is noted that the thru-hole is not drawn to scale in FIG. 6 and is depicted as being larger than its actual size, in order to depict the access to the top side of the Thomson coil 10 afforded by the thru-hole 137.

Figure 7:
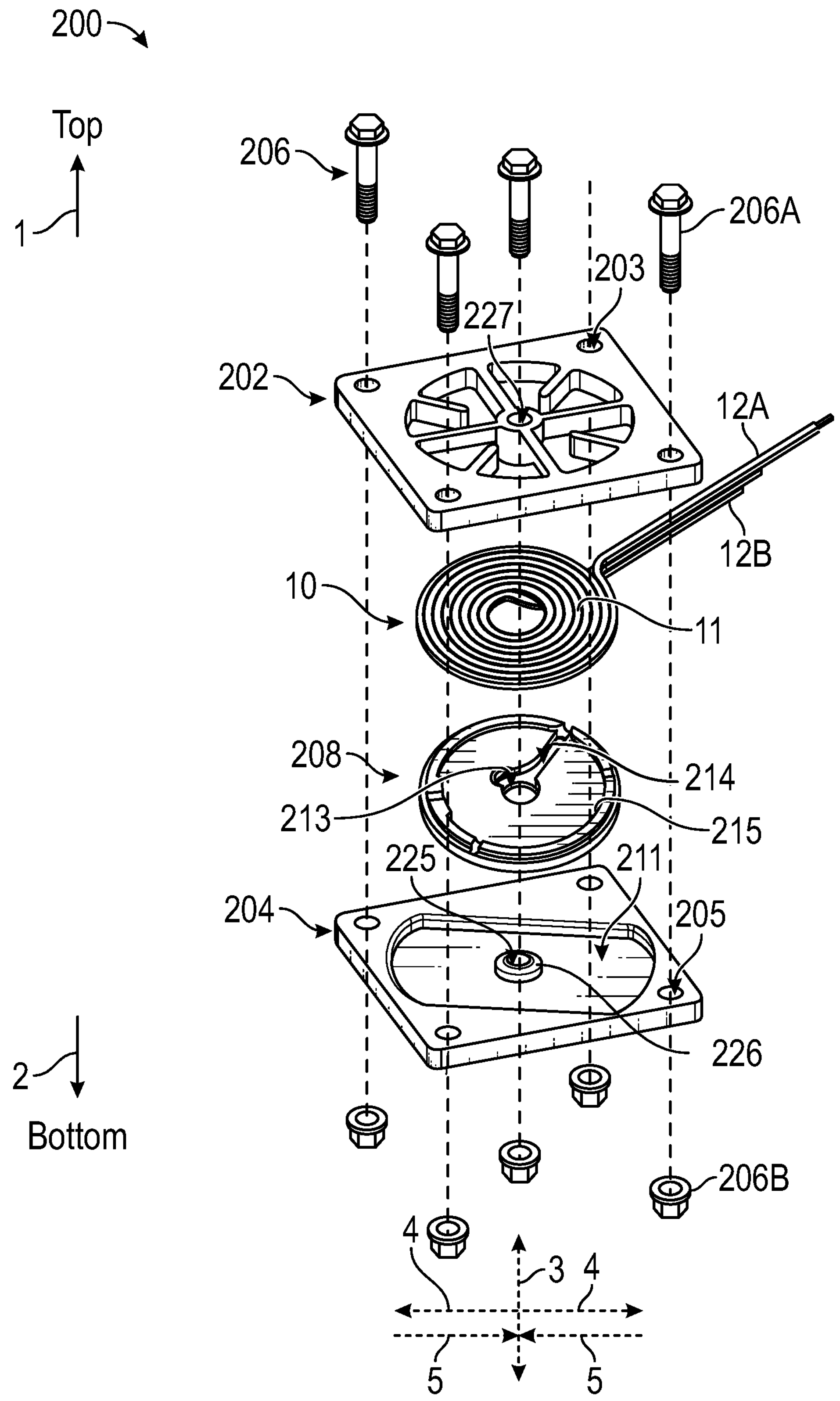
FIG. 7 is an exploded view of an insulation manufacturing assembly for producing an insulation layer for a Thomson coil using a potting process, in accordance with another example embodiment of the disclosed concept.
Figure 8:
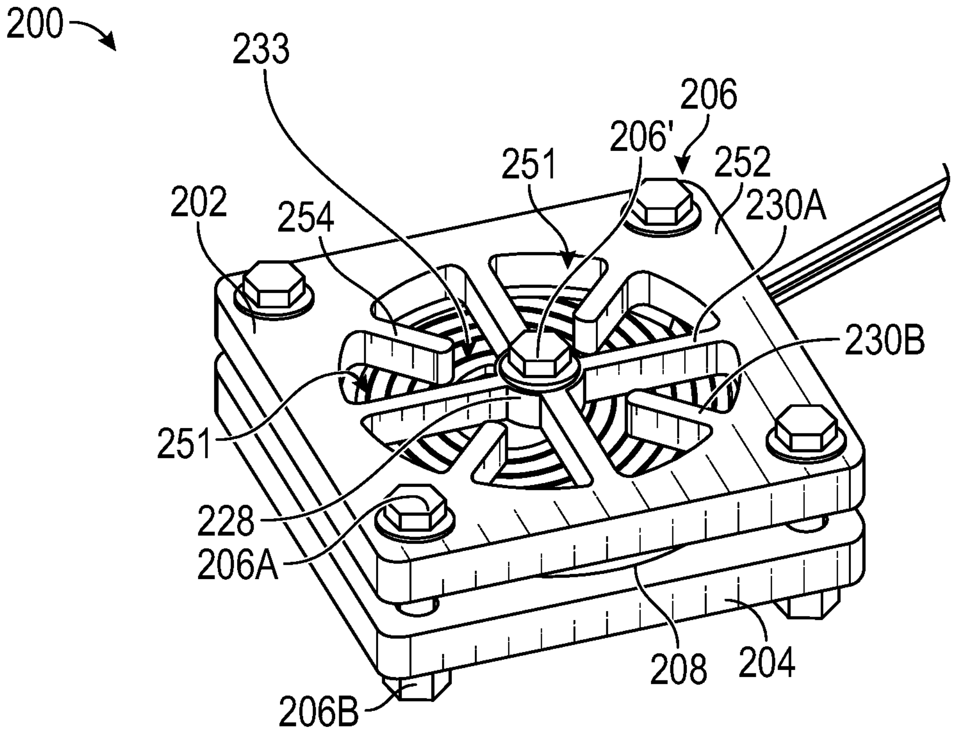
FIG. 8 is a perspective view of the insulation manufacturing assembly shown in FIG. 7.

Referring now to FIGS. 7-8, an insulation manufacturing assembly 200 in accordance with another embodiment of the disclosed concept is shown, the insulation manufacturing assembly 200 being structured for use in producing an insulation layer for a Thomson coil 10 using a potting process. The insulation manufacturing assembly 200 is referred to hereinafter as the "assembly 200" for brevity. The assembly 200 is identical to the assembly 100 in several respects, as it is only the cover plate 202 of the assembly 200 that is notably distinct from the cover plate 102 of the assembly 100. Accordingly, those features of the assembly 200 that structurally and functionally correspond to features of the assembly 100 are numbered in FIGS. 7-8 with the same reference numbers used in FIGS. 1A-6, but incremented by 100. For example and without limitation, the assembly 200 includes a base plate 202 and fasteners 206 that are identical to the base plate 102 and fasteners 106 of assembly 100. The coil housing 208 is identical to the coil housing 108, except that the coil housing 208 does not include a material injection cutout. (As previously noted in connection with the description of the cover plate 102' and coil housing 108' shown in FIG. 6, the coil housing 108' is identical to the coil housing 208 shown in FIG. 7).

In addition, the components of assembly 200 are structured to be coupled together in the same manner as the components of the assembly 100 prior to commencement of the insulation layer manufacturing process. It is noted that the assembly 200 is structured to produce an insulation layer for the same type of Thomson coil 10 as the assembly 100. For the sake of brevity, those features of the assembly 200 that are structurally and functionally identical to those of the assembly 100 are not described again hereinafter. Only the features of the cover plate 202 will be described in detail, and it should be understood that all other components of the assembly 200 are structurally and functionally identical to their correspondingly numbered component of the assembly 100.

Reference now made to FIG. 8. In contrast with assembly 100, assembly 200 is structured to be used for manufacturing the insulation layer of the Thomson coil 10 using a potting process rather than a high-pressure injection process. Accordingly, the components of the assembly 200 do not include features corresponding to the material injection cutouts 134, 135 and material injection path 136 of the assembly 100. Instead, the cover plate 202 includes several large openings 251, with each opening 251 functioning as a potting section into which epoxy can be poured. An opening 251 may be referred to hereinafter as a "potting section 251", as context necessitates.

Although shaped and positioned differently from the ribs 130 of the cover plate 102, the cover plate 202 also includes a plurality of ribs 230, which includes both a plurality of partitioning ribs 230A and partial ribs 230B (detailed further later herein). When the Thomson coil 10 and the cover plate 202 are seated on the coil housing 208, the bottom surface of each rib 230 engages the top surface of the Thomson coil 10 and is proportioned and positioned to be able to secure multiple turns 15 of the Thomson coil 10 at a time, in order to ensure that the Thomson coil 10 forms a level surface when the epoxy layer is forming, i.e. such that the turns 15 lie flat relative to one another. While the cover plate 202 is depicted in the figures as comprising four partitioning ribs 230A and four partial ribs 230B, it will be appreciated that greater or fewer than four ribs 230A and 230B can be included in the cover plate 202 without departing from the scope of the disclosed concept.

The partitioning ribs 230A extend from a lateral border 252 of the cover plate 202 to a downward protruding rim 228 (aligned with the central axis 3) that receives the central fastener 206', with the partitioning ribs 230A creating the distinct potting sections 251 such that the interior of each potting section 251 is isolated from the interior of every other potting section 253. It will be appreciated that the number of potting sections 251 is dependent upon the number of partitioning ribs 230A.

Within each potting section 251 is a partial rib 230B that extends from the lateral border 252 toward the downward protruding rim 228 but does not reach the downward protruding rim 228. For each partial rib 230B, the end that is not connected to the lateral border 252 is the free end 254. The gap between each of the free ends 254 and the downward protruding rim 228 serves as a material flow passage 233 that enables epoxy poured into one area of a potting section 251 to flow and fill in the entirety of that potting section 251. It will be appreciated that more than one partial rib 230B can be included in each potting section 251 without departing from the scope of the disclosed concept.

Once pouring of the epoxy is complete and the liquid epoxy has solidified, the manufacturing of the insulation layer is complete. The final product of the insulation manufacturing process using the assembly 200 is a unitary structure comprising the Thomson coil 10 seated in and coupled to the coil housing 208 via the epoxy, with a layer of solidified epoxy coating the Thomson coil 10, and this final product is referred to hereinafter as the "housed and insulated Thomson coil 10"" (not shown in the figures). After the epoxy has solidified, the fasteners 206 are removed from the assembly 100, the cover plate 202 is unseated from the top of the coil housing 208, and the coil housing 208 is unseated from the base plate 204.

Prior to coupling the components of the assembly 200 together and pouring epoxy into each of the potting sections 251, anti-adhesion primer is applied to the surfaces of the cover plate 202 to facilitate easy removal of the cover plate 202 from the epoxy-coated Thomson coil 10 and coil housing 208 after the epoxy has set. The assembly 200 is placed into a vacuum chamber after the epoxy is poured in order to eliminate any air bubbles that may form during pouring of the epoxy. It will be appreciated that achieving uniform thickness of the insulation layer is harder to achieve with potting using the assembly 200 than with the injection process performed with the assembly 100, so after the epoxy has set and the cover plate 202 is removed from the housed and insulated coil 10", the potted epoxy layer is machined in order to bring the epoxy layer to uniform thickness. It will be appreciated that sanding, grinding, or any other method suitable for leveling a surface can be used to even out the potted epoxy layer.

Similarly to the housed and insulated coil 10', if needed, any areas of the housed and insulated Thomson coil 10" that are not covered by epoxy (i.e. those areas of the top side of the Thomson coil 10 that were engaged by the ribs 230 of the cover plate 202) can be filled in with insulating material using any suitable method, for example and without limitation, by overmolding, or using insulating tape or insulating plastic parts.

While there are obvious differences between the structure of the cover plate 202 and the cover plate 102, the assembly 100 and the assembly 200 have significant features in common. The ribs 130 and ribs 230 enable epoxy to flow freely through the material flow passages 133 and 233, while ensuring that all turns 15 of the Thomson coil remain level and minimizing how much exposed surface area of the Thomson coil 10 is prevented from being covered by the epoxy during the injection or potting process. Both the assembly 100 and the assembly 200 facilitate greatly improved large-scale and automated manufacturing of housed and insulated Thomson coils with a uniform insulation layer.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An insulation manufacturing assembly for manufacturing an insulation layer for a Thomson coil, the assembly comprising:

a base plate;

a coil housing structured to seat the Thomson coil;

a cover plate comprising a plurality of ribs and a plurality of flow passages; and a number of fasteners that fasten the cover plate, the coil housing, and the base plate to one another, wherein the base plate seats the coil housing and the coil housing seats the cover plate, wherein the ribs are structured to engage multiple turns of the Thomson coil and secure the multiple turns in place such that the multiple turns form a level surface, and wherein the flow passages are structured to enable a liquid epoxy to flow around the ribs and cover a top surface of the Thomson coil that faces away from the coil housing.

2. The insulation manufacturing assembly of claim 1, wherein the coil housing comprises a central opening structured to align with a central opening of the Thomson coil, wherein the base plate comprises an upward protruding rim inserted snugly within the central opening of the coil housing, wherein the cover plate comprises a downward protruding rim inserted snugly within the central opening of the coil housing, and wherein the upward protruding rim and downward protruding rim align with one another such that one fastener of the number of fasteners is inserted through the downward protruding rim, the Thomson coil central opening, the coil housing central opening, and the upward protruding rim.

3. The insulation manufacturing assembly of claim 2, wherein the coil housing is structured to seat a bottom surface of the Thomson coil, the bottom surface of the Thomson coil being disposed opposite the top surface of the Thomson coil, wherein the cover plate comprises a flow passage surface structured to face the top surface of the Thomson coil, wherein the ribs extend from the flow passage surface toward the top surface of the Thomson coil, and wherein the flow passage surface is structured such that the flow passages are disposed between the ribs and there is one continuous space formed comprising the flow passages.

4. The insulation manufacturing assembly of claim 2, wherein the coil housing comprises a top side that faces toward the cover plate and a bottom side disposed opposite the top side that faces the base plate, wherein the top side of the coil housing is formed with a coil seating surface, a flange, and a lip, such that the flange surrounds the coil seating surface and the lip surrounds the flange, wherein the flange is formed with an injection cutout, wherein the injection cutout is structured to receive a high-pressure epoxy injector, and wherein the flow passages are structured such that injected liquid epoxy can flow freely along the top surface of the Thomson coil, flow into any spaces between individual turns of the Thomson coil, and flow into any spaces between an outermost edge of the coil and the coil housing.

5. The insulation manufacturing assembly of claim 2, wherein the cover plate comprises a flow passage surface structured to face the top surface of the Thomson coil, wherein the ribs extend from the flow passage surface toward the top surface of the Thomson coil, wherein the cover plate comprises a thru-hole extending from a top side of the cover plate to a bottom side of the cover plate and disposed between the ribs, and wherein the thru-hole is disposed such that injecting the liquid epoxy into the thru-hole enables the liquid epoxy to flow through the flow passages.

6. The insulation manufacturing assembly of claim 2, wherein the downward protruding rim is structured to prevent the liquid epoxy from flowing into the Thomson coil central opening and the coil housing central opening.

7. The insulation manufacturing assembly of claim 2, wherein the coil housing is structured to seat a bottom surface of the Thomson coil, the bottom surface of the Thomson coil being disposed opposite the top surface of the Thomson coil, wherein the cover plate comprises a plurality of partitioning ribs and a central portion that includes the downward protruding rim, wherein the partitioning ribs extend from a border of the cover plate to the central portion, wherein the partitioning ribs form a plurality of potting sections such that, an interior of each potting section is isolated from an interior of every other potting section, wherein each potting section comprises at least one partial rib that extends from the border portion but does not reach the central portion, and wherein the cover plate is structured such that the flow passages only allow liquid epoxy poured within a given potting section to flow within that given potting section.

8. The insulation manufacturing assembly of claim 7, wherein the downward protruding rim is structured to prevent the liquid epoxy from flowing into the Thomson coil central opening and coil housing central opening.

9. An insulation manufacturing assembly for manufacturing an insulation layer for a Thomson coil, the assembly comprising:

a base plate;

a coil housing structured to seat the Thomson coil, the coil housing comprising:

a coil seating surface with a central opening; and a trough disposed adjacent to the central opening;

a cover plate, the cover plate comprising:

a plurality of ribs;

a plurality of flow passages; and an overflow cutout;

a number of fasteners that fasten the cover plate, the coil housing, and the base plate to one another, wherein the base plate seats the coil housing and the coil housing seats the cover plate, wherein the ribs are structured to engage multiple turns of the Thomson coil and secure the multiple turns in place such that the multiple turns form a level surface, wherein the flow passages are structured to enable a liquid epoxy to flow around the ribs and cover a top surface of the Thomson coil that faces away from the coil housing, and wherein the overflow cutout aligns with the trough such that an excess amount of the liquid epoxy can flow out of the insulation manufacturing assembly.

10. The insulation manufacturing assembly of claim 9, wherein the trough is disposed below the coil seating surface and structured to receive any lead of the Thomson coil that is disposed below a planar portion of the Thomson coil.

11. The insulation manufacturing assembly of claim 9, wherein the cover plate further comprises a bottom flat surface and a flow passage surface disposed above the bottom flat surface, wherein the plurality of ribs extend downward from the flow passage surface such that a bottom surface of each rib is disposed above the bottom flat surface.

12. The insulation manufacturing assembly of claim 11, wherein the overflow cutout is formed in the bottom flat surface.

* * * * *